United States Patent
Mohanan et al.

(10) Patent No.: US 7,854,002 B2
(45) Date of Patent: Dec. 14, 2010

(54) PATTERN MATCHING FOR SPYWARE DETECTION

(75) Inventors: Harish Mohanan, Hyderabad (IN); Perraju Bendapudi, Hyderabad (IN); Rajesh Jalan, Hyderabad (IN); SriSatya Aravind Akella, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 895 days.

(21) Appl. No.: 11/796,844

(22) Filed: Apr. 30, 2007

(65) Prior Publication Data

US 2008/0271147 A1 Oct. 30, 2008

(51) Int. Cl.
G06F 21/22 (2006.01)
G06F 9/45 (2006.01)
(52) U.S. Cl. ............ 726/22; 726/23; 726/24; 726/25; 713/188; 717/152
(58) Field of Classification Search .............. None
See application file for complete search history.

(56) References Cited

U.S. PATENT DOCUMENTS

| | | | | |
|---|---|---|---|---|
| 5,278,901 | A | 1/1994 | Shieh et al. | 726/22 |
| 6,292,938 | B1* | 9/2001 | Sarkar et al. | 717/138 |
| 7,114,185 | B2 | 9/2006 | Moore et al. | 726/24 |
| 7,409,717 | B1* | 8/2008 | Szor | 726/24 |
| 7,624,449 | B1* | 11/2009 | Perriot | 726/24 |
| 2004/0172551 | A1* | 9/2004 | Fielding et al. | 713/200 |
| 2005/0028002 | A1* | 2/2005 | Christodorescu et al. | 713/200 |
| 2005/0177736 | A1* | 8/2005 | de los Santos et al. | 713/188 |
| 2005/0278781 | A1* | 12/2005 | Zhao et al. | 726/22 |
| 2006/0005241 | A1* | 1/2006 | Zhao et al. | 726/22 |
| 2006/0107055 | A1 | 5/2006 | Panwar et al. | 713/176 |
| 2006/0156397 | A1 | 7/2006 | Daj | 726/22 |
| 2006/0161560 | A1* | 7/2006 | Khandelwal et al. | 707/100 |
| 2006/0230453 | A1* | 10/2006 | Flynn et al. | 726/24 |
| 2007/0016952 | A1 | 1/2007 | Stevens | 726/24 |
| 2007/0016953 | A1 | 1/2007 | Morris et al. | 726/24 |
| 2007/0028110 | A1 | 2/2007 | Brennan | 713/176 |
| 2008/0071783 | A1* | 3/2008 | Langmead et al. | 707/6 |

OTHER PUBLICATIONS

Bruschi, D., Lorenzo, M., Monga, M., "Using Code Normalization for Fightin Self-Mutating Malware", Department of Computer Science, University of Milan, Technical Report, Aug. 2006.*

(Continued)

Primary Examiner—Ian N Moore
Assistant Examiner—Alexander Lagor
(74) Attorney, Agent, or Firm—Merchant & Gould P.C.

(57) ABSTRACT

Spyware programs are detected even if their binary code is modified by normalizing the available code and comparing to known spyware patterns. Upon normalizing the known spyware code patterns, a signature of the normalized code is generated. Similar normalization techniques are employed to reduce the executable binary code as well. A match between the normalized spyware signature and the patterns in the normalized executable code is analyzed to determine whether the executable code includes a known spyware. For pattern matching, Deterministic Finite Automata (DFA) is constructed for basic blocks and simulated on the basic blocks of target executable, hash codes are generated for instructions in target code and known spyware code and compared, register usages are replaced with common variables and compared, and finally Direct Acyclic Graphs (DAGs) of all blocks are constructed and compared to catch reordering of mutually independent instructions and renamed variables.

17 Claims, 5 Drawing Sheets

OTHER PUBLICATIONS

Wang, T., Horng, S., Su, M., Wu, C., Wang, P., Su, W., "A Surveillance Spyware Detection System Based on Data Mining Methods", IEEE Conf. Proc. on Evolutionary Computation, Vancouver, BC, Canada, Jul. 2006.*

Stolfo et al., "Fileprint Analysis for Malware Detection", http://worminator.cs.columbia.edu/papers/2005/WormPaper-Final.pdf, Jun. 19, 2005, 12 pp.

Kirda et al., "Behavior-based Spyware Detection", \https://www.cs.ucsb.edu/research/tech_reports/reports/2006-03.pdf, Mar. 2006, 24 pp.

Bozagac, "Application of Data Mining based Malicious Code Detection Techniques for Detecting new Spyware", http://www.cs.bilkent.edu.tr/~guvenir/courses/cs550/Workshop/Cumhur_Doruk_Bozagac.pdf, retrieved Feb. 2007, 8 pp.

* cited by examiner

PATTERN MATCHING FOR SPYWARE DETECTION

BACKGROUND

Spyware is computer software that collects personal information about users without their informed consent. The term is often used interchangeably with adware and malware (software designed to infiltrate and damage a computer respectively). Personal information is secretly recorded with a variety of techniques, including logging keystrokes, recording Internet web browsing history, and scanning documents on the computer's hard disk. Purposes may range from overtly criminal (theft of passwords and financial details) to the merely annoying (recording Internet search history for targeted advertising, while consuming computer resources). Spyware may collect different types of information. Some variants attempt to track the websites a user visits and then send this information to an advertising agency. More malicious variants attempt to intercept passwords or credit card numbers as a user enters them into a web form or other applications.

The spread of spyware has led to the development of an entire anti-spyware industry. Its products remove or disable existing spyware on the computers they are installed on and prevent its installation. However, a number of companies have incorporated forms of spyware into their products. These programs are not considered malware, but are still spyware as they watch and observe for advertising purposes.

Commonly available antispyware programs typically check for known binary patterns of known spywares in a file. If the binary pattern is slightly altered such that the spyware functionality does not get affected, the antispyware tools may not be able to detect spyware programs. An example case is adding a dummy NOP instruction to the original spyware binary code. Other techniques of getting around current techniques include variable renaming, register renaming, dead code insertion, and so on.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to detecting spyware programs even if their binary code is modified by normalizing the available code and comparing to known patterns. Upon normalizing the known spyware code patterns, a signature of the normalized code may be generated. Similar normalization techniques may be employed to reduce the executable binary code as well. A match between the normalized spyware signature and the patterns in the normalized executable code may be sought to determine whether the executable code includes a known spyware.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, spyware programs with modified binary patterns may be detected by normalizing the binary code prior to comparison to known patterns. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
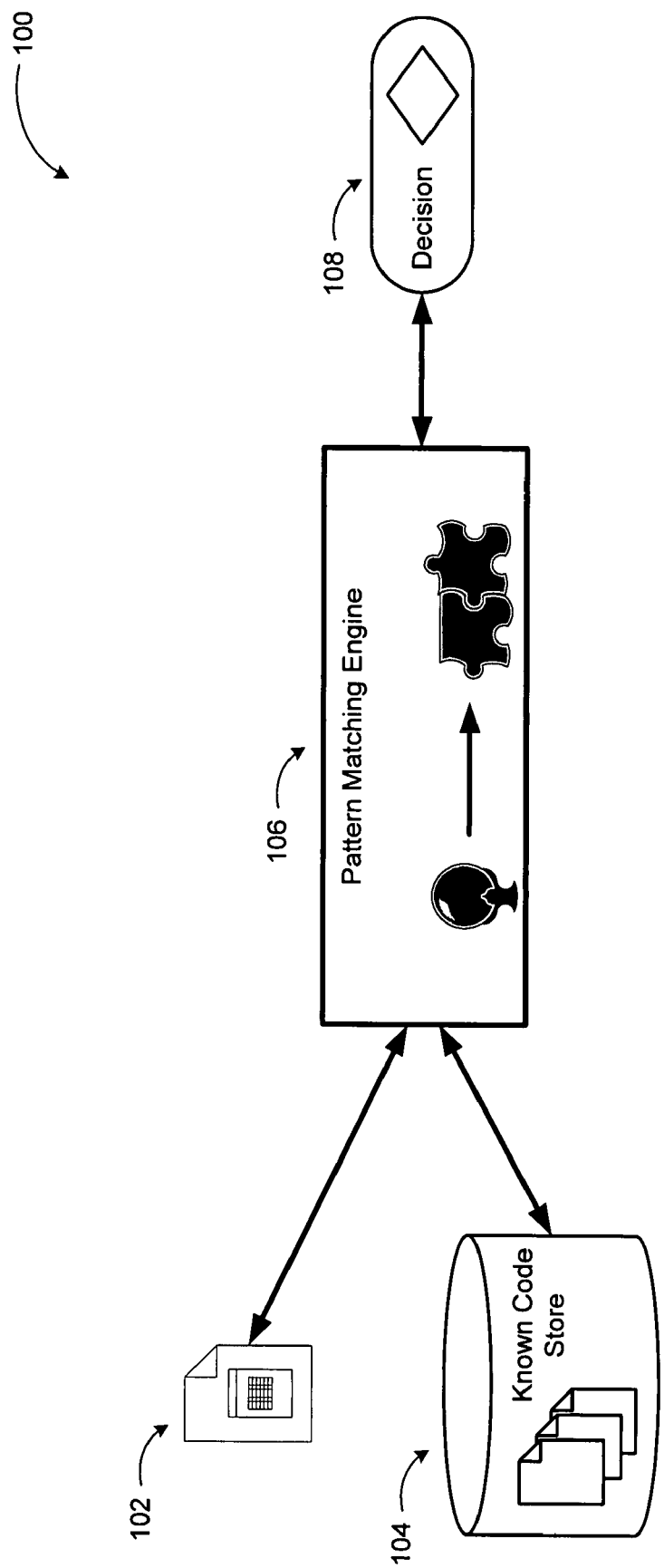
FIG. 1 illustrates an example pattern matching system for spyware detection.

Referring to FIG. 1, example pattern matching system 100 for spyware detection is illustrated. A target executable file 102 potentially embedded with spyware may be received and analyzed by an anti spyware application. As part of the anti-spyware application, pattern matching engine 106 may receive the code suspected of being spyware and compare to known codes from known code store 104. If one or more matching patterns of binary code are found, a decision 108 about the target executable file 102 is rendered. The decision 108 may be a binary decision (yes or no) or a list of matching spywares with a confidence level value indicating how confident the system is of the match.

While commonly available anti spyware programs utilize a number of pattern matching techniques to determine whether a piece of code is part of a known spyware, spyware manufacturers counter with methods, ranging from simple to highly sophisticated, to disguise their spyware. Some of common obfuscation techniques include:

Addition of No Operation commands (NOPs) and NOP like instructions, which are effective NOPs;

Introducing redundant control flows;

Register renaming;

Variable renaming;

Reordering of mutually independent instructions;

Adding common sub-expressions; and

Dead code insertion.

NOP or NOOP is an assembly language instruction, sequence of programming language statements, or computer protocol command that does nothing at all. Most computer instruction sets include an instruction that does nothing for a specific number of clock cycles; it makes no changes to memory or program status. NOPs are most commonly used for timing purposes, to force memory alignment, to prevent hazards, to occupy a branch delay slot, or as a "place-holder" to be replaced by active instructions later on in program development. NOP can also be used as a description for what a function or sequence of programming language statements does. If the function or code has no effect, then it could be called a NOP or NOOP. The remaining obfuscation methods are self-explanatory, all intended to skew a pattern matching algorithm by creating subtle differences that do not affect the functionality of the underlying executable code.

A pattern matching engine according to embodiments is arranged to normalize the known antispyware code pattern, generate a signature of the normalized code, and employ the same normalization techniques to reduce the executable binary code. Then, a match between the normalized spyware signature and the patterns in the normalized executable code is sought to determine whether the executable code includes a known spyware.

Performing an optimization called "peephole optimization" to remove unnecessary jumps and merge the basic blocks (by removing unwanted control transfer instructions) of code. This reduces the control flow graph of the target binary code. If the normalized control flows match, a Deterministic Finite Automata (DFA) may be constructed from its instructions for all the basic blocks in the source binary code. The DFA constructed on the basic blocks in the target binary may then be simulated trying to match them.

In the theory of computation, a deterministic finite state machine or deterministic finite automation (DFA) is a finite state machine where for each pair of state and input symbol there is one and only one transition to a next state. DFAs recognize the set of regular languages and no other languages. A DFA takes in a string of input symbols. For each input symbol it transitions to a state given by following a transition function. When the last input symbol has been received, it either accepts or rejects the string depending on whether the DFA is in an accepting state or a non-accepting state.

For example, a DFA is a 5-tuple, $(S, \Sigma, T, s, A)$, consisting of:

a finite set of states (S);

a finite set called the alphabet ($\Sigma$);

a transition function $(T: S \times \Sigma \rightarrow S)$;

a start state ($s \in S$); and a set of accept states ($A \subseteq S$).

If M is a DFA such that $M=(S, \Sigma, T, s, A)$, and $X=x_0, x_1 \ldots x_m$ is a string over the alphabet $\Sigma$, M accepts the string X if a sequence of states, $r_0, r_1, \ldots, r_n$, exists in S with the following conditions:

$r_0 = s$ $r_{i+1} = T(r_i, x_i)$, for $i =, \ldots, n-1$ $m \in A$.

As shown in the first condition, the machine starts in the start state s. The second condition says that given each character of string X, the machine will transition from state to state as ruled by the transition function T. The last condition says that the machine accepts if the last input of X causes the machine to be in one of the accepting states. Otherwise, it is said to reject the string. The set of strings it accepts form a language, which is the language the DFA recognizes.

DFAs are one of the most practical models of computation, since there is a trivial linear time, constant-space, online algorithm to simulate a DFA on a stream of input.- Given two DFAs, there are efficient algorithms to find a DFA recognizing the union, intersection, and complements of the languages they recognize. There are also efficient algorithms to determine whether a DFA accepts any strings, whether a DFA accepts all strings, whether two DFAs recognize the same language, and to find the DFA with a minimum number of states for a particular regular language.

For any modified spyware patterns not caught by the DFA based matching step, hash codes may be generated for each instruction (by analyzing its def-use chain) in the source and target binary codes and try to match them. A further step includes replacing register usages with a common variable and then trying to match. This may catch cases where purely registers used in the instructions are different though their functionality is same. After the register checking step, a Direct Acyclic Graph (DAG) of all blocks may be constructed and a match sought. This step is intended to catch cases where mutually independent instructions are reordered or variables are renamed. An example scenario for this method is discussed below in conjunction with FIG. 2.

A system according to embodiments is not limited to the example system and its components described above. Spyware detection using pattern matching may be implemented with fewer or additional components performing additional or fewer tasks using the principles described herein.

Figure 2:
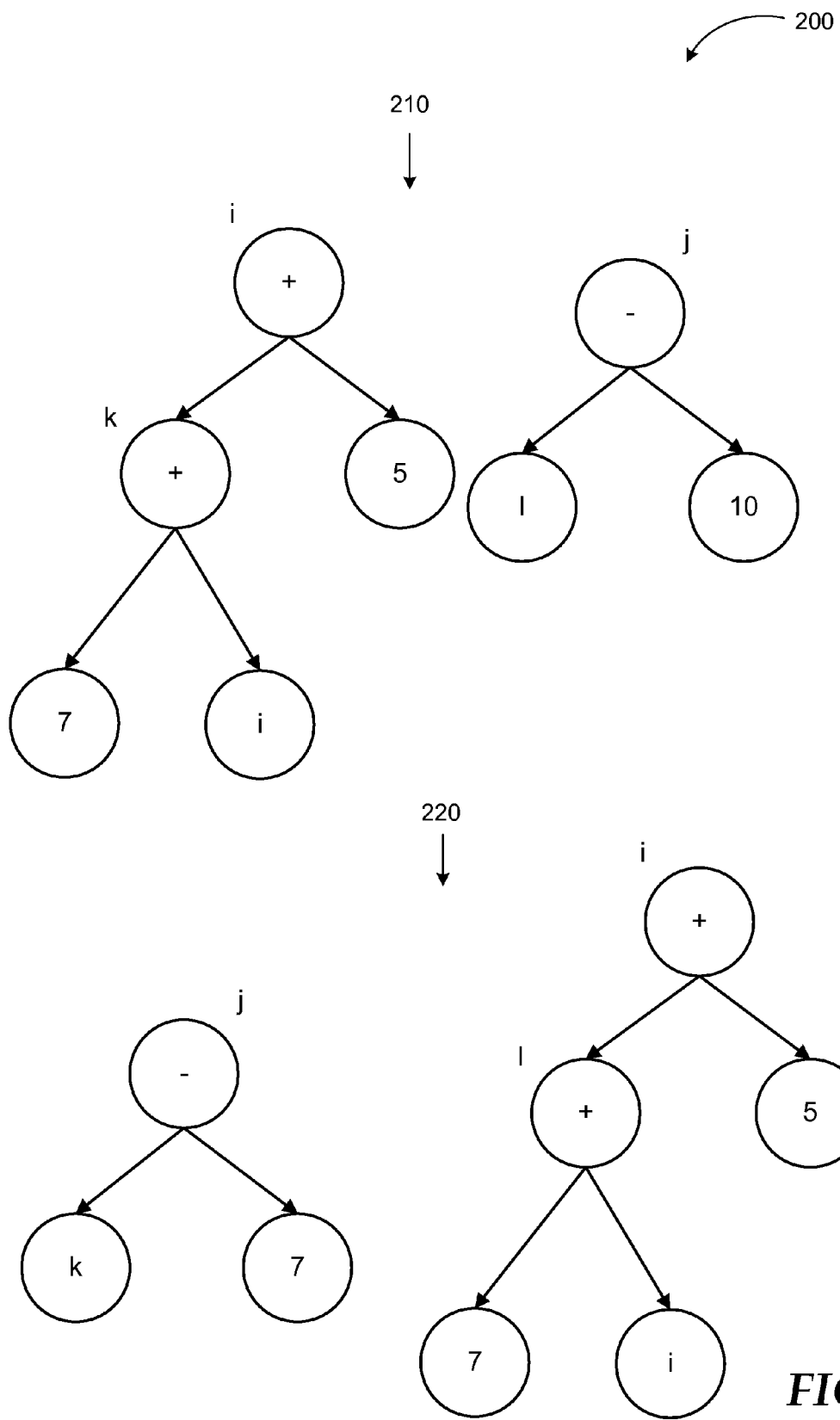
FIG. 2 illustrates an example Direct Acyclic Graph (DAG) as part of the normalization technique used in pattern matching for spyware detection according to embodiments.

FIG. 2 illustrates two example Direct Acyclic Graphs (DAGs) 200 as part of the normalization technique used in pattern matching for spyware detection according to embodiments.

A Directed Acyclic Graph (DAG) is a directed graph with no directed cycles; that is, for any vertex v, there is no non-empty directed path that starts and ends on v. DAGs appear in models where it does not make sense for a vertex to have a path to itself; for example, if an edge $u \rightarrow v$ indicates that v is a part of u, such a path would indicate that u is a part of itself, which is impossible.

Every directed acyclic graph corresponds to a partial order on its vertices, in which $u \leq v$ is in the partial order exactly when there exists a directed path from u to v in the graph. However, many different directed acyclic graphs may represent the same partial order in this way. Among these graphs, the one with the fewest edges is the transitive reduction and the one with the most edges is the transitive closure.

A source is a vertex with no incoming edges, while a sink is a vertex with no outgoing edges. A finite DAG has at least one source and at least one sink. The length of a finite DAG is the length (number of edges) of a longest directed path.

Every directed acyclic graph has a topological sort, an ordering of the vertices such that each vertex comes before all vertices it has edges to. In general, this ordering is not unique. Any two graphs representing the same partial order have the same set of topological sort orders. DAGs can be considered to be a generalization of trees in which certain subtrees can be shared by different parts of the tree. In a tree with many identical subtrees, this can lead to a drastic decrease in space requirements to store the structure. Conversely, a DAG can be expanded to a forest of rooted trees.

Some algorithms become simpler when used on DAGs instead of general graphs. For example, search algorithms like depth-first search without iterative deepening normally must mark vertices they have already visited and not visit them again. If they fail to do this, they may never terminate because they follow a cycle of edges forever. Such cycles do not exist in DAGs.

Referring back to FIG. 2, a DAG of all blocks may be constructed and a match sought to catch cases where mutually independent instructions are reordered or variables are renamed. The example DAGs 200 of FIG. 2 are based on an example block that is effectively representing the following high-level language code involving arithmetic operations on integer variables:

K=I+7;
J=L-10;
I=5+K;

The first DAG 210 represents the above described block, which may be operationally summarized as:

[I]→[I]+12
[J]→[L]-10
[K]→[I]+7
[L]→[L]

In the target binary, the first two instructions may be interchanged (mutually independent) and the variables K and L may be interchanged, resulting in:

J=K-7;
L=I+7;
I=5+L;

The second DAG 220 represents the above described block, which may be operationally summarized as:

[I]→[I]+12
[J]→[K]-10
[K]→[K]
[L]→[I]+7

DAGs 210 and 220 may be compared for equivalence after being generated. Full equivalence may indicate 100% confidence that a known spyware pattern is found. Lesser degrees of confidence may also be determined based on the equivalence levels and reported. If all of the steps described above fail, the program may report with high confidence that the target executable is not infected by one of the known spywares in the spyware store.

While specific normalization and matching techniques are used and described, a system according to embodiments is not limited to the definitions and examples described above. Spyware detection using pattern matching may be provided using additional or fewer steps and techniques.

Figure 3:
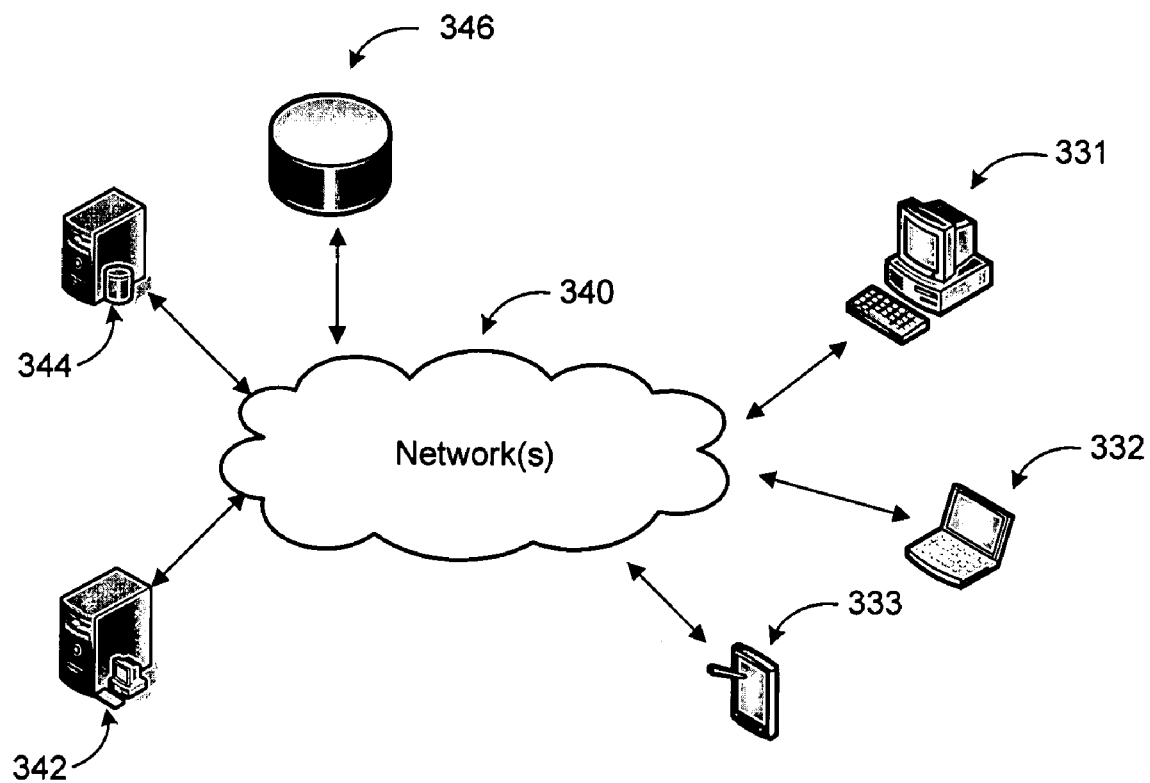
FIG. 3 is an example networked environment, where embodiments may be implemented.

FIG. 3 is an example networked environment, where embodiments may be implemented. Anti spyware applications and spyware detection systems may be implemented locally on a single computing device or in a distributed manner over a number of physical and virtual clients and servers. They may also be implemented in un-clustered systems or clustered systems employing a number of nodes communicating over one or more networks (e.g. network(s) 340).

Such a system may comprise any topology of servers, clients, Internet service providers, and communication media. Also, the system may have a static or dynamic topology. The term "client" may refer to a client application or a client device. While a networked system implementing spyware detection using pattern matching may involve many more components, relevant ones are discussed in conjunction with this figure.

A pattern matching engine according to embodiments may be implemented as part of a anti spyware application in individual client devices 331-333 or executed in server 342 and accessed from anyone of the client devices (or applications). Data stores associated with providing spyware pattern matching such as a known spyware store may be embodied in a single data store such as data store 346 or distributed over a number of data stores associated with individual client devices, servers, and the like. Dedicated database servers (e.g. database server 344) may be used to coordinate data retrieval and storage in one or more of such data stores.

Network(s) 340 may include a secure network such as an enterprise network, an unsecure network such as a wireless open network, or the Internet. Network(s) 340 provide communication between the nodes described herein. By way of example, and not limitation, network(s) 340 may include wired media such as a wired network or direct-wired connection, and wireless media such as acoustic, RF, infrared and other wireless media.

Many other configurations of computing devices, applications, data sources, data distribution systems may be employed to implement providing pattern matching for spyware detection. Furthermore, the networked environments discussed in FIG. 3 are for illustration purposes only. Embodiments are not limited to the example applications, modules, or processes.

Figure 4:
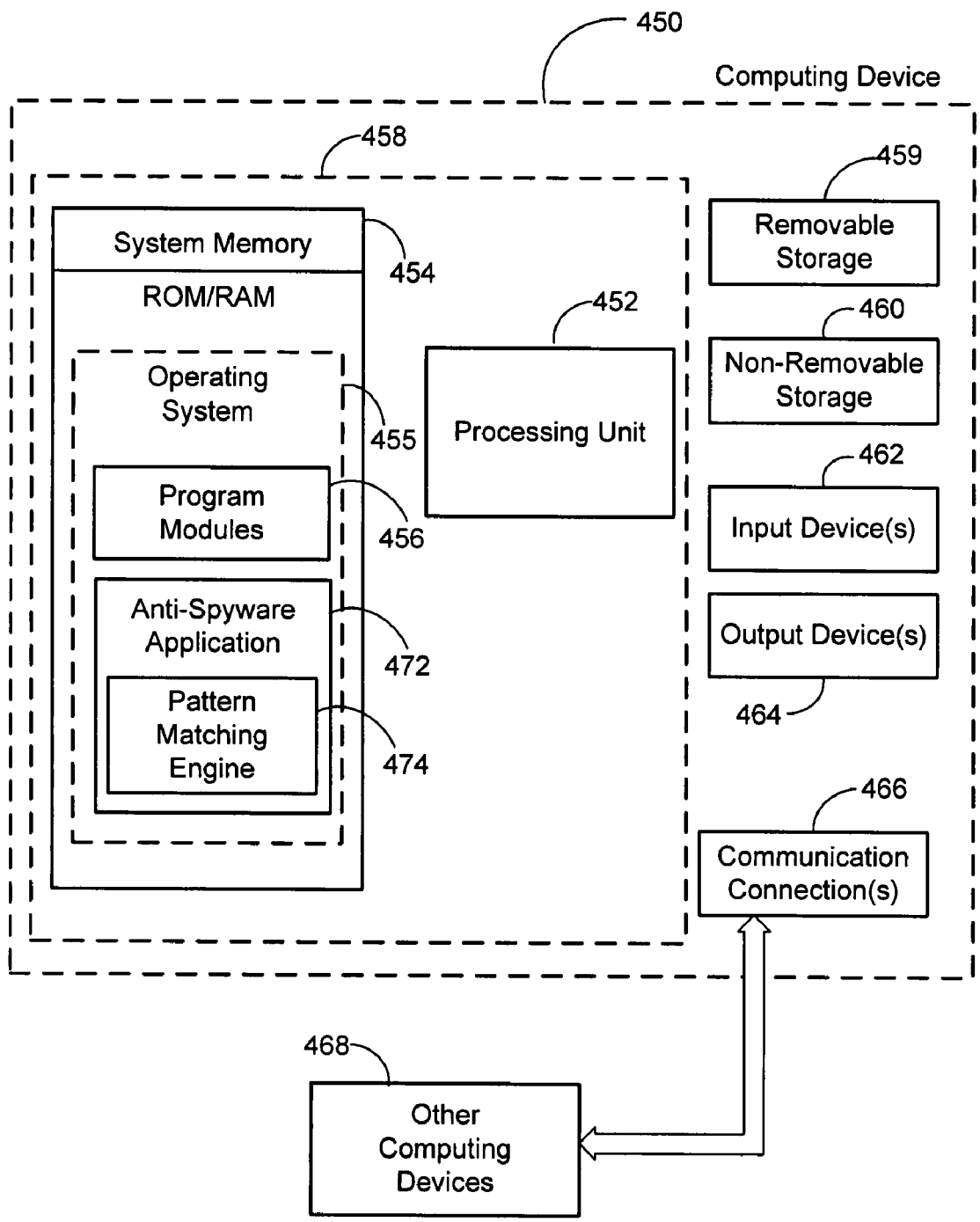
FIG. 4 is a block diagram of an example computing operating environment, where embodiments may be implemented.

FIG. 4 and the associated discussion are intended to provide a brief, general description of a suitable computing environment in which embodiments may be implemented. With reference to FIG. 4, a block diagram of an example computing operating environment is illustrated, such as computing device 450. In a basic configuration, the computing device 450 may be a client device or server providing anti spyware service and typically include at least one processing unit 452 and system memory 454. Computing device 450 may also include a plurality of processing units that cooperate in executing programs. Depending on the exact configuration and type of computing device, the system memory 454 may be volatile (such as RAM), non-volatile (such as ROM, flash memory, etc.) or some combination of the two. System memory 454 typically includes an operating system 455 suitable for controlling the operation of a networked personal computer, such as the WINDOWS® operating systems from MICROSOFT CORPORATION of Redmond, Washington. The system memory 454 may also include one or more software applications such as program modules 456, anti spyware application 472, and pattern matching engine engine 474.

Anti spyware application 472 may be a separate application or an integral module of a desktop service that provides other services to applications associated with computing device 450. Pattern matching engine 474 may provide services associated with normalizing known spyware code patterns, generating a signature of the normalized code, employing the same normalization techniques to reduce the executable binary code, and then searching for a match between the normalized spyware signature and the patterns in the normalized executable code to determine whether the executable code includes a known spyware, as described previously. This basic configuration is illustrated in FIG. 4 by those components within dashed line 458.

The computing device 450 may have additional features or functionality. For example, the computing device 450 may also include additional data storage devices (removable and/or non-removable) such as, for example, magnetic disks, optical disks, or tape. Such additional storage is illustrated in FIG. 4 by removable storage 459 and non-removable storage 460. Computer storage media may include volatile and non-volatile, removable and non-removable media implemented in any method or technology for storage of information, such as computer readable instructions, data structures, program modules, or other data. System memory 454, removable storage 459 and non-removable storage 460 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 450. Any such computer storage media may be part of device 450. Computing device 450 may also have input device(s) 462 such as keyboard, mouse, pen, voice input device, touch input device, etc. Output device(s) 464 such as a display, speakers, printer, etc. may also be included. These devices are well known in the art and need not be discussed at length here.

The computing device 450 may also contain communication connections 466 that allow the device to communicate with other computing devices 468, such as over a wireless network in a distributed computing environment, for example, an intranet or the Internet. Other computing devices 468 may include server(s) that provide updates associated with the anti spyware service. Communication connection 466 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 5:
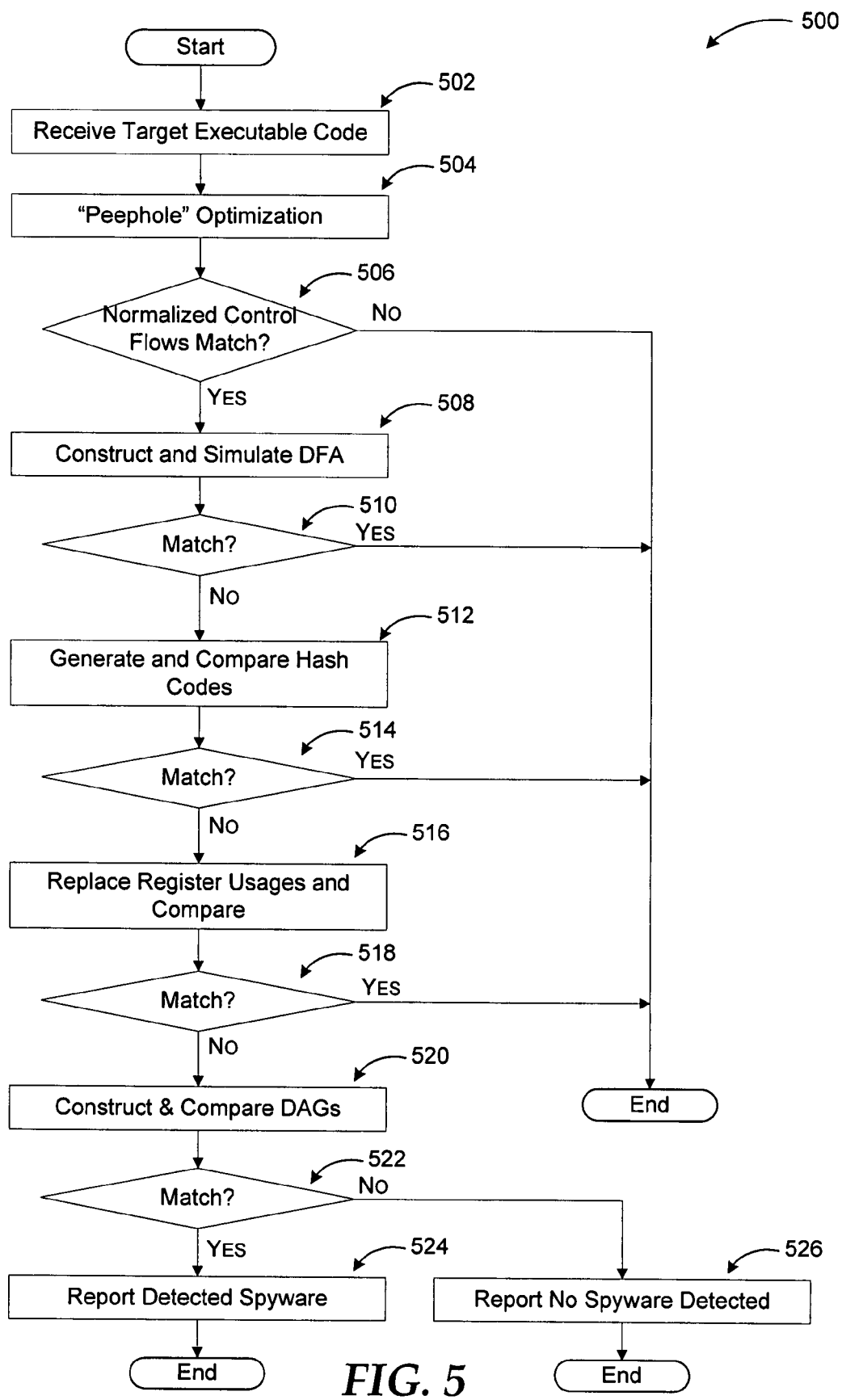
FIG. 5 illustrates a logic flow diagram of a pattern matching process for spyware detection.

FIG. 5 illustrates a logic flow diagram of a pattern matching process for spyware detection. Process 500 may be implemented as part of an anti spyware application.

Process 500 begins with operation 502, where target executable code is received. Target executable code is any code that is suspected of having spyware appended to it. Processing advances from operation 502 to operation 504.

At operation 504, a "peephole" optimization is performed to remove unnecessary jumps and merge the basic blocks (by removing unwanted control transfer instructions) of code. This reduces the control flow graph of the target binary code. Processing continues to decision operation 506 from operation 504.

At decision operation 506, a determination is made whether the normalized flow controls match. If the normalized flow controls match, processing continues to operation 508. Otherwise, processing moves to a calling process for further actions.

At operation 508, a DFA is constructed for all the basic blocks in the source binary code. The DFA is then simulated on the basic blocks in the target binary. Processing moves to decision operation 510 from operation 508.

At decision operation 510, a determination is made whether a match is found based on the DFA simulation. If a match is found, processing continues to operation 512. Otherwise, processing moves to a calling process for further actions.

At operation 512, hash codes are generated for each instruction by analyzing its def-use chain in the source and target binary code. The hash codes are then compared. Processing advances to decision operation 514 from operation 512.

At decision operation 514, a determination is made whether a match is found based on the hash code comparison. If a match is found, processing continues to operation 516. Otherwise, processing moves to a calling process for further actions.

At operation 516, register usages are replaced with a common variable and then compared. Processing advances to decision operation 518 from operation 516.

At decision operation 518, a determination is made whether a match is found based on the replaced register usage comparison. If a match is found, processing continues to operation 520. Otherwise, processing moves to a calling process for further actions.

At operation 520, DAGs are constructed for all blocks to catch cases where mutually independent instructions have been reordered or variables have been renamed. The DAGs are then compared. Processing advances to decision operation 522 from operation 520.

At decision operation 522, a determination is made whether a match is found based on the DAG comparison. If a match is found, processing continues to operation 524. Otherwise, processing moves to operation 526.

At operation 524, detected spyware is reported. At operation 526 following, a negative determination at decision operation 522, a report is provided indicating that no spyware has been detected. After operations 524 and 526, processing moves to a calling process for further actions.

The operations included in process 500 are for illustration purposes. Providing pattern matching for spyware detection may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing pattern matching in a spyware detection system, the method comprising:
   normalizing a target executable code and at least one known spyware code by optimizing a control flow of each code;
   comparing the control flows of the normalized target executable code and normalized at least one known spyware code;
   if the control flows match, constructing a Deterministic Finite Automata (DFA) for basic blocks of the at least one known spyware code;
   simulating the DFA on basic blocks of the target executable code to determine a match;
   if no match is found, constructing a Direct Acyclic Graph (DAG) of the blocks of the at least one known spyware code and another DAG of the blocks of the target executable code, wherein the DAG of the blocks of the at least one known spyware code and the another DAG of the blocks of the target executable code each comprise at least one block representing language code involving mutually independent instructions comprising arithmetic operations on integer variables, wherein, in the another DAG, at least two of the mutually independent arithmetic instructions and at least two of the integer variables are interchanged with respect to the DAG;
   comparing the DAG and the another DAG to determine a match, wherein a full match between the DAG and the another DAG indicates that a known spyware pattern has been found and wherein when the comparison indicates less than a full equivalence between the DAG and the another DAG, reporting a confidence level that a known spyware pattern has been found based on a level of the less than a full equivalence between the DAG and the another DAG; and
   if no match is found, providing a report indicating no spyware is found in the target executable code.

2. The method of claim 1, further comprising: generating a first set of hash codes based on instructions in the at least one known spyware code; generating a second set of hash codes based on instructions in the target executable code; and
   comparing the first set and the second set of hash codes to determine a match.

3. The method of claim 2, further comprising: replacing register usages in the target executable code with a common variable; and comparing the register usages of the target executable code and the at least one known spyware code to determine a match.

4. The method of claim 3, further comprising: if a match is found as a result of any comparison, providing a report indicating that a known spyware is found in the target executable code.

5. The method of claim 1, wherein optimizing the control flow of each code includes at least one of removing unnecessary jumps and merging the basic blocks.

6. The method of claim 5, wherein merging the basic blocks includes at least one of removing unwanted control transfer instructions and removing No Operation (NOP) instructions.

7. The method of claim 1, further comprising:
   determining a first checksum based on the normalized target executable code and a second checksum based on the normalized at least one known spyware code;
   comparing the first and the second checksums; and
   determining whether the first and the second checksums match based on the comparison.

8. A system for providing pattern matching in a spyware detection system, the system comprising:
   a memory;
   a processor coupled to the memory, wherein the processor is configured to execute program modules including:
      a communication module configured to receive a target executable code and a known spyware code;
      a pattern matching module configured to:
         normalize the target executable code and the known spyware code by optimizing a control flow of each code through at least one of removing unnecessary jumps and merging the basic blocks;
         compare the control flows of the normalized target executable code and normalized at least one known spyware codes;
         construct a DFA for basic blocks of the known spyware code if the control flows match;
         determine a match based on simulating the DFA on basic blocks of the target executable code;
         construct a DAG of the blocks of the known spyware code and another DAG of the blocks of the target executable code if no match is found, wherein the DAG of the blocks of the known spyware code and the another DAG of the blocks of the target executable code each comprise at least one block representing language code involving mutually independent instructions comprising arithmetic operations on integer variables, wherein, in the another DAG, at least two of the mutually independent arithmetic instructions and at least two of the integer variables are interchanged with respect to the DAG; and
         compare the DAG and the another DAG to determine a match, wherein a full match between the DAG and the another DAG indicates that a known spyware pattern has been found and wherein when the comparison indicates less than a full equivalence between the DAG and the another DAG, reporting a confidence level that a known spyware pattern has been found based on a level of the less than a full equivalence between the DAG and the another DAG;
      a reporting module configured to provide a report indicating no spyware is found in the target executable code if no match is determined by the pattern matching module.

9. The system of claim 8, wherein the pattern matching module is further configured to:
   generate a first set of hash codes based on instructions in the known spyware code;
   generate a second set of hash codes based on instructions in the target executable code; and
   compare the first set and the second set of hash codes to determine a match.

10. The system of claim 9, wherein the pattern matching module is further configured to:
   replace register usages in the target executable code with a common variable; and
   compare the register usages of the target executable code and the known spyware code to determine a match.

11. The system of claim 10, wherein the reporting module is further configured to provide a report indicating that a known spyware is found in the target executable code if a match is found as a result of any comparison.

12. The system of claim 10, wherein the reporting module is further configured to provide a report indicating an overall confidence level value.

13. The system of claim 8, wherein the pattern matching module and the reporting module are part of an anti spyware application.

14. The system of claim 8, further comprising a known spyware store for storing variations of known spywares.

15. A computer-readable storage medium, wherein the computer-readable storage medium does not consist of a propagated data signal, the computer-readable storage medium having stored thereon computer executable instructions that, when executed by a processor, perform a method for providing pattern matching in a spyware detection system, the method comprising:

receiving a target executable code and a known spyware code;

determining whether the target executable code includes a variation of the known spyware code based on at least one of:

optimizing a control flow of each code through at least one of removing unnecessary jumps and merging the basic blocks, and comparing the optimized control flows;

constructing a DFA for basic blocks of the known spyware code if the control flows match, and determining a match based on simulating the DFA on basic blocks of the target executable code; and constructing a first DAG of the blocks of the known spyware code and a second DAG of the blocks of the target executable code if no match is found, and comparing the first and second DAGs to determine a match, wherein the first DAG of the blocks of the known spyware code and the second DAG of the blocks of the target executable code each comprise at least one block representing language code involving mutually independent instructions comprising arithmetic operations on integer variables, wherein, in the second DAG, at least two of the mutually independent arithmetic instructions and at least two of the integer variables are interchanged with respect to the first DAG, wherein a full match between the first DAG and the second DAG indicates that a known spyware pattern has been found and wherein when the comparison indicates less than a full equivalence between the first DAG and the second DAG, reporting a confidence level that a known spyware pattern has been found based on a level of the less than a full equivalence between the first DAG and the second DAG.

16. The computer-readable storage medium of claim 15, wherein the instructions further comprise:

generating a first set and a second set of hash codes based on instructions in the known spyware code and the target executable code, and comparing the first set and the second set of hash codes to determine a match; and replacing register usages in the target executable code with a common variable, and comparing the register usages of the target executable code and the known spyware code to determine a match.

17. The computer-readable storage medium of claim 15, wherein the instructions further comprise:

displaying a report based on the determination of whether the target executable code includes a variation of the known spyware code.

\* \* \* \* \*